(12) United States Patent
Yoon

(10) Patent No.: US 6,234,445 B1
(45) Date of Patent: May 22, 2001

(54) PUMP MOTOR MOUNTING ARRANGEMENT

(75) Inventor: Yong Moon Yoon, Seoul (KR)

(73) Assignee: Daewoo Heavy Industries, Ltd., Incheon (KR)

( * ) Notice: Subject to any disclaimer, the term of this patent is extended or adjusted under 35 U.S.C. 154(b) by 0 days.

(21) Appl. No.: 09/475,077

(22) Filed: Dec. 30, 1999

(30) Foreign Application Priority Data

Dec. 30, 1998 (KR) .............................................. 98-27751 U

(51) Int. Cl.$^7$ ...................................................... F16M 1/00
(52) U.S. Cl. ............................................. 248/638; 248/674
(58) Field of Search .................................. 248/675, 678, 248/674, 638, 201, 300

(56) References Cited

U.S. PATENT DOCUMENTS

| | | | |
|---|---|---|---|
| 1,609,939 | * | 12/1926 | Gehrung ................................ 248/672 |
| 1,656,426 | * | 1/1928 | Cunningham ........................... 232/39 |
| 4,865,289 | * | 9/1989 | Lawson ................................. 248/666 |

* cited by examiner

Primary Examiner—Anita M. King
Assistant Examiner—Holly N. Sy
(74) Attorney, Agent, or Firm—Staas & Halsey, LLP

(57) ABSTRACT

A pump motor mounting arrangement includes a vehicle frame and a motor bracket fixedly secured to a side of the pump motor, the motor bracket having an upper extension and a lower extension to which a bottom positioning bolt is removably attached. A support ledge is affixed to the vehicle frame for supporting the lower extension of the motor bracket. The support ledge has a slot extending generally in parallel to the vehicle frame and receiving the head of the bottom positioning bolt. The pump motor mounting arrangement further includes a top fixture plate for, when tightened, depressing the upper extension of the motor bracket against the vehicle frame to keep the pump in place and for, when loosened, allowing the pump motor to be slidingly moved on the support ledge into a temporary maintenance position.

8 Claims, 6 Drawing Sheets

PUMP MOTOR MOUNTING ARRANGEMENT

FIELD OF THE INVENTION

The present invention relates generally to an industrial vehicle equipped with a fluid pump and an electric pump motor for rotatingly driving the fluid pump, and more specifically to a pump motor mounting arrangement that allows easier mounting and demounting of the pump motor while permitting lateral sliding movement of the pump motor between an in-use position and an easy-to-access maintenance position.

BACKGROUND OF THE INVENTION

Forklift trucks have been used either to lift goods of relatively heavy weight up to an elevated location or to lower the goods on the ground. The forklift trucks also can be used to move the goods from one place to another within a limited working area. Depending on the power sources employed, the forklift trucks are classified into an engine-driven forklift truck which may usually operate in an outdoor area and an electromotive forklift truck which are suitable for indoor operation, thanks to its reduced or little emission of exhaust gas and operating noise. The electromotive forklift truck is usually provided with an electric pump motor which in turn serves to rotatingly drive a fluid pump for discharging high pressure working fluid to be supplied to a steering system, a brake system and a variety of working implements.

With reference to FIGS. 1 and 2, there is illustrated a typical motor mounting structure wherein a pump motor 10 is detachably mounted to a frame 12 of a forklift truck. The pump motor 10 is adapted to be supplied with electricity from a rechargeable battery(not shown) and can produce torque needed to rotate a fluid pump 14 which remains directly coupled to the pump motor 10.

In the illustrated prior art example, the pump motor 10 is provided with a motor bracket 16 firmly secured at four points to the frame 12 by bolt-nut fastener units 18 in a suspended condition. Each of the bolt-nut fastener units 18 consists of a bolt 20 passing through the thickness of the frame 12 and the motor bracket 16, a couple of washers 22, a bushing 24 and a nut 26 threadedly coupled to the bolt 20.

One drawback of the above-mentioned prior art motor mounting structure is that, in order to attach or detach the pump motor to or from the forklift trucker frame, all of the fastener units have to be completely tightened or untigthened through the use of a suitable wrench not shown in the drawings. This would make the task of mounting or demounting the pump motor time-consuming and laborious. The narrow spacing left between the pump motor and the motor bracket makes it difficult to gain access to and then turn the nut with a wrench.

The prior art mounting structure as set forth above is also disadvantageous in that it has a single fixed mounting position and therefore cannot be shifted to a temporary maintenance position wherein parts or components of the pump motor may be readily checked, repaired and replaced with little possibility of interference with environmental structures. This means that complete removal of the pump motor from the vehicle frame is unavoidable whenever needs exist for maintenance of the motor components, however trivial the nature of maintenance may be. Attendant problems in the complete removable of the pump motor is that fluid lines and/or electrical harness must be disconnected and reconnected before and after the pump motor removal operation. In addition to the above shortcomings, the prior art pump motor mounting structure is unsuitable for effectively inhibiting vibration of the pump motor from delivery to the vehicle frame, which would hinder comfortable driving of the industrial vehicle.

SUMMARY OF THE INVENTION

With the deficiencies inherent in the prior art taken into account, it is an object of the present invention to provide a pump motor mounting arrangement for industrial vehicles which facilitate the task of mounting and demounting a pump motor to and from a vehicle frame.

Another object of the invention is to provide a pump motor mounting arrangement of the type capable of permitting a pump motor to be shifted to a temporary maintenance position without having to completely detach the pump motor from a vehicle frame.

A further object of the invention is to provide a pump motor mounting arrangement for industrial vehicles that can effectively preventing vibration of a pump motor from being transmitted to a vehicle frame, thus improving the comfort of a vehicle driver.

In accordance with the present invention, there is provided a pump motor mounting arrangement for detachably mounting a pump motor to an industrial vehicle, comprising: a vehicle frame; a motor bracket fixedly secured to the pump motor, the motor bracket having an upper extension and a lower extension; a bottom positioning member provided on the lower extension of the motor bracket and having a downwardly projecting head; a support ledge affixed to the vehicle frame for supporting the lower extension of the motor bracket, the support ledge having a slot extending generally in parallel to the vehicle frame, the head of the bottom positioning member adapted to be in sliding engagement with the slot of the support ledge; and fixture means for, when tightened, depressing the upper extension of the motor bracket against the vehicle frame to keep the pump motor in place and for, when loosened, allowing the pump motor to be slidingly moved on the support ledge into a temporary maintenance position.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

Figure 1:
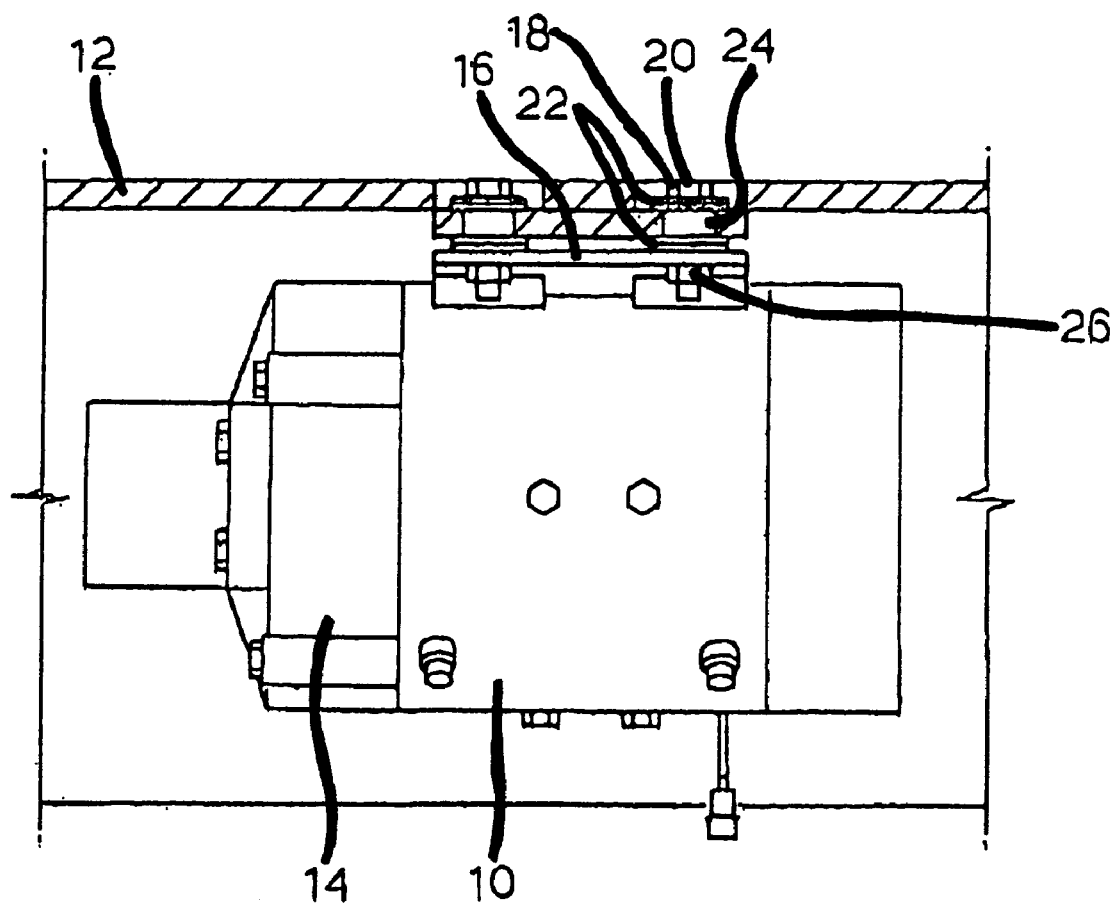
FIG. 1 is a front elevational view showing a prior art pump motor mounting structure, with a vehicle frame partially cut away for clarity.
Figure 2:
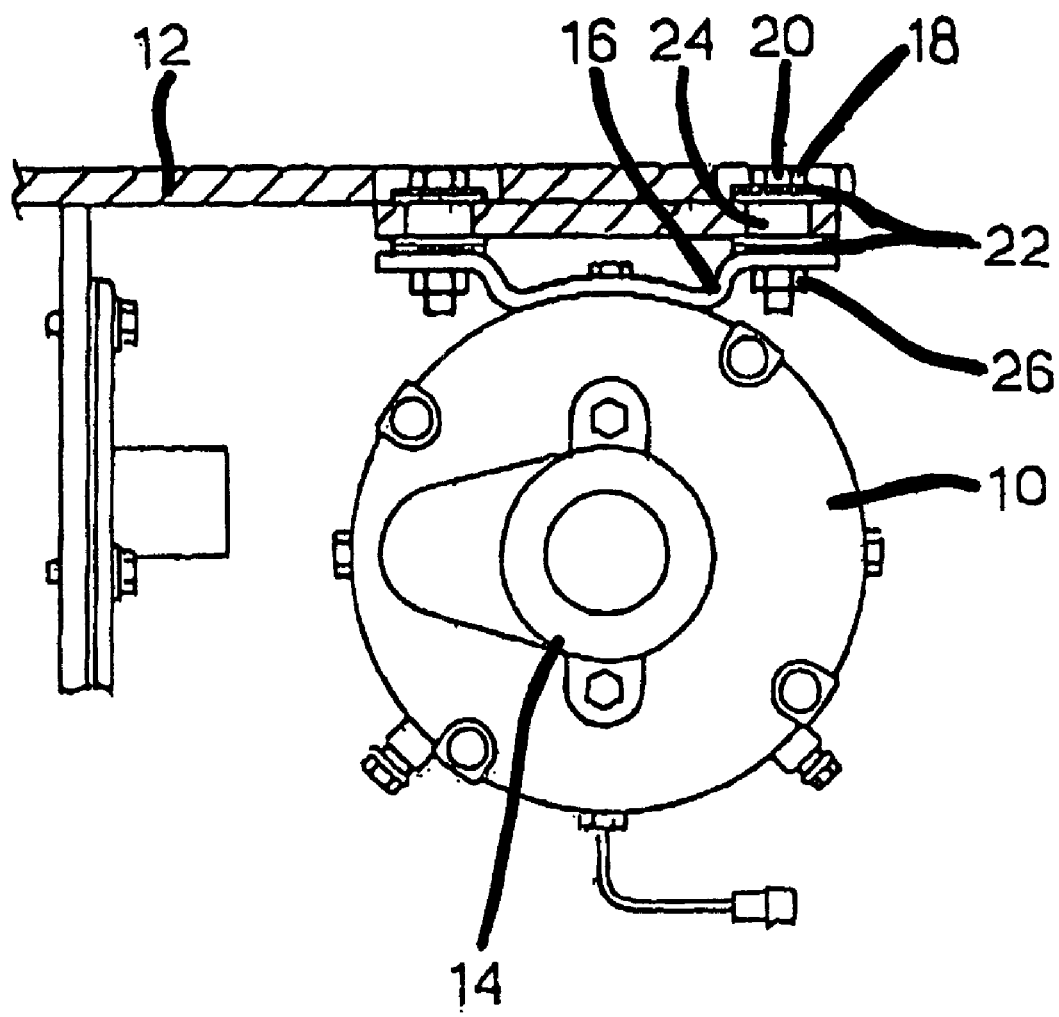
FIG. 2 is a side elevational view of the prior art pump motor mounting structure shown in FIG. 1.
Figure 3:
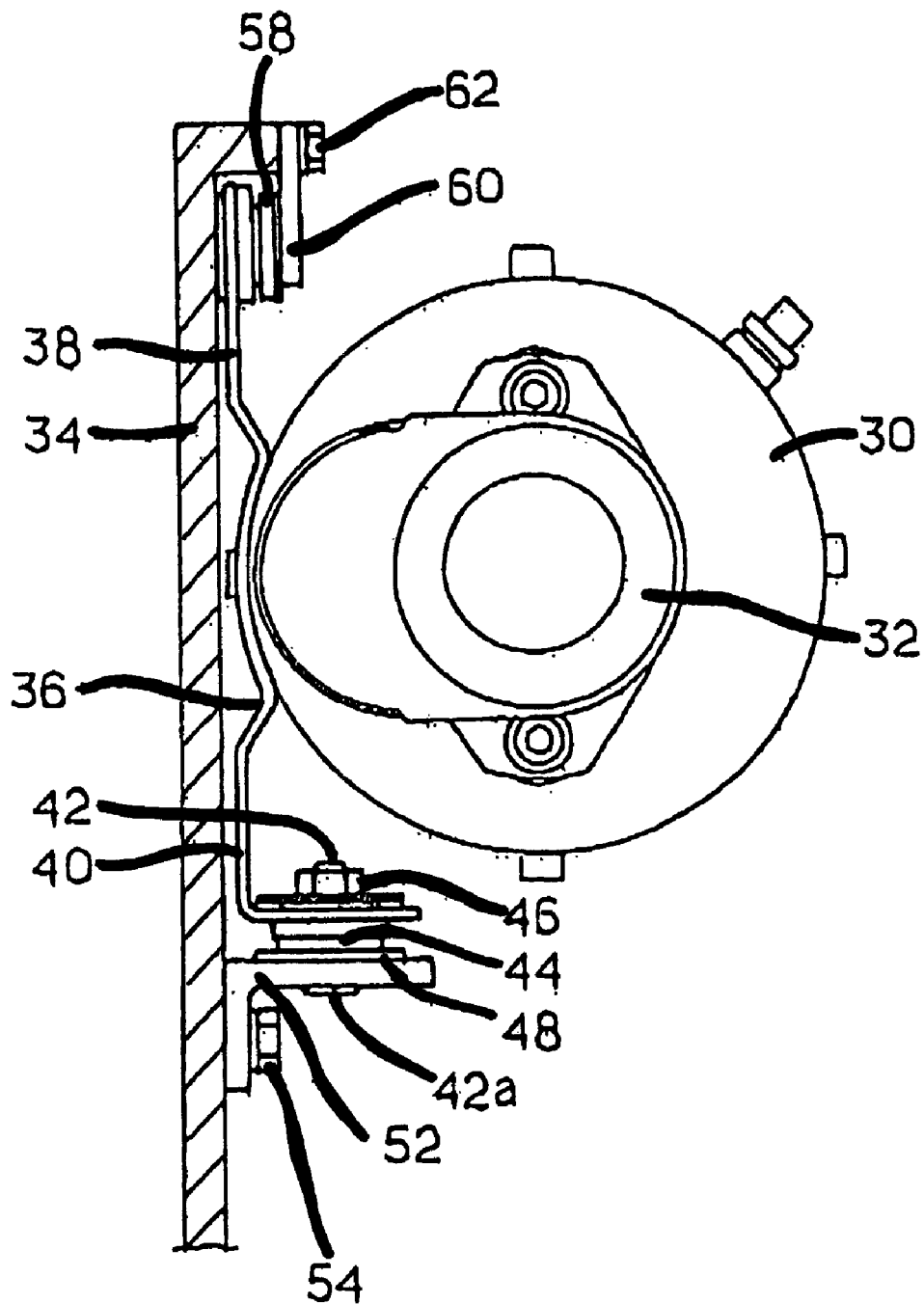
FIG. 3 is a partially sectional side elevational view illustrating a pump motor mounting arrangement in accordance with the invention.
Figure 4:
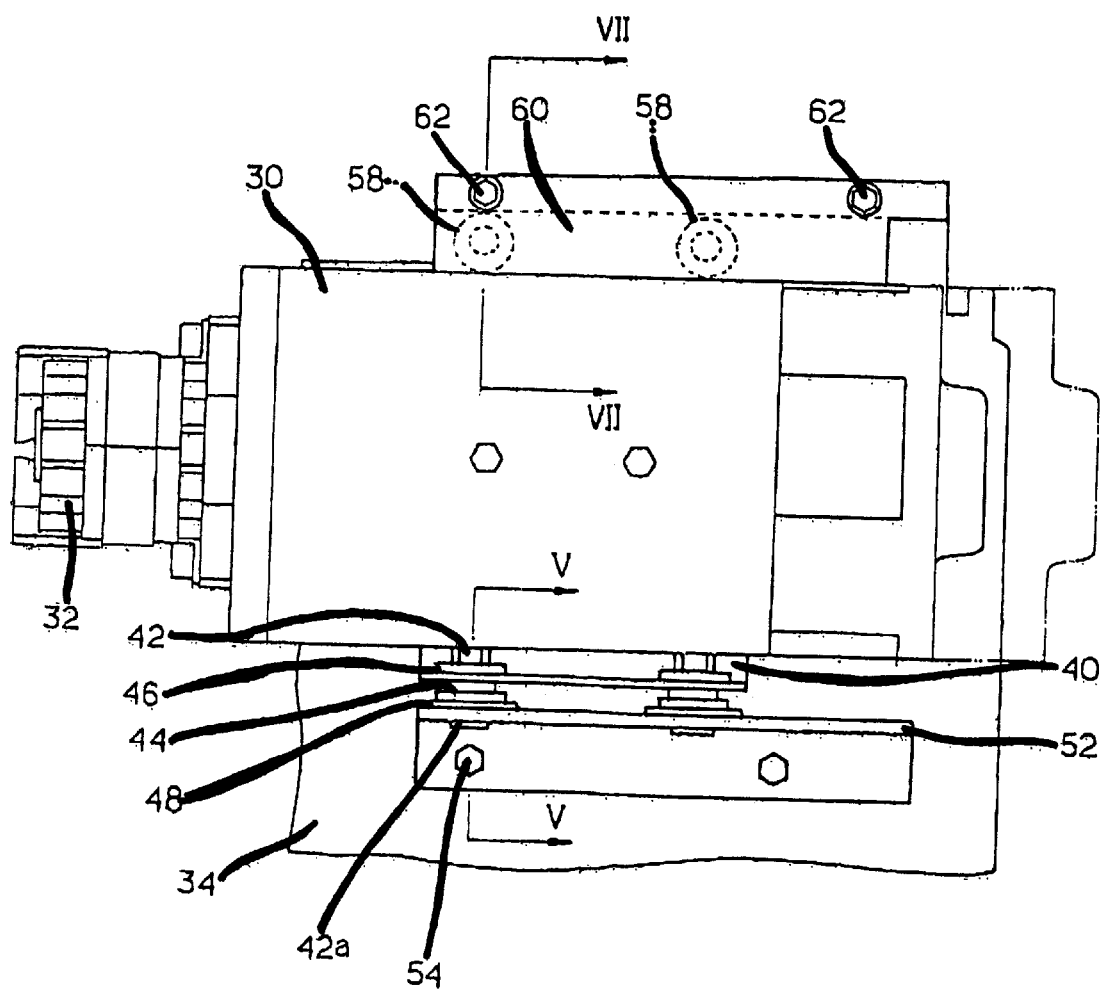
FIG. 4 is a front elevational view of pump motor mounting arrangement in accordance with the invention, with double-dotted phantom lines indicating a pump motor moved to a temporary maintenance position.

With reference to FIGS. 3 and 4, it can be seen that there is shown a pump motor mounting arrangement in accordance with the invention. The motor mounting arrangement can be advantageously employed in detachably mounting an electric pump motor 30 to an industrial vehicle such as forklift trucks. The electric pump motor 30 is adapted to rotatingly drive a fluid pump 32 which in turn can produce high pressure working fluid to be fed to a steering system, brake system and a variety of working implements not shown in the drawings.

The pump motor mounting arrangement includes a vehicle frame 34 which extends in a vertical direction and a motor bracket 36 fixedly secured to a side of the pump motor 30 as clearly shown in FIG. 3. The motor bracket 36 is fabricated from a press-molded metal plate and has an upper straight extension 38 and a lower extension 40 of generally L-shaped configuration.

Figure 5:
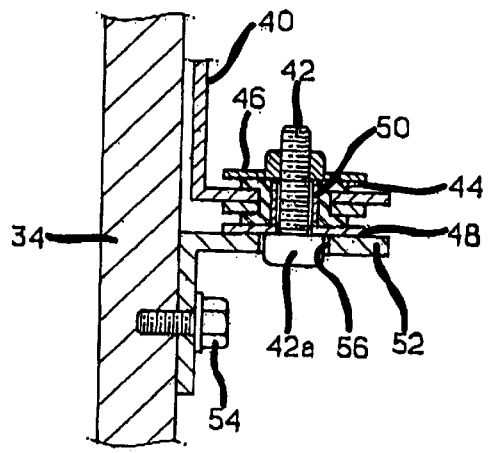
FIG. 5 is a sectional view taken along line V—V in FIG. 4, best illustrating the lower extension of a motor bracket slidably supported on a support ledge.
Figure 6:
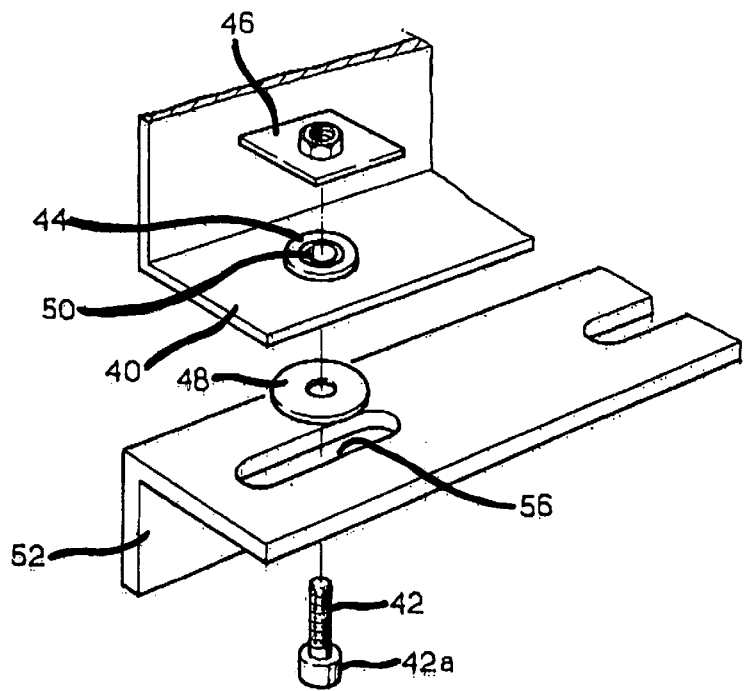
FIG. 6 is a partially broken perspective view showing the lower extension of a motor bracket, a bottom positioning member removably attached to the motor bracket and a support ledge with a slot for receiving the downwardly projecting head of the bottom positioning member.

As best illustrated in FIGS. 5 and 6, a bottom positioning bolt 42 with a head 42a is removably affixed to the lower extension 40 of the motor bracket 36 in an inverted condition so that the head 42a of the bottom positioning bolt 42 can project downwardly from the lower extension 40 of the motor bracket 36. It should be noted that a bottom rubber grommet 44 is inserted through the thickness of the lower extension 40 of the motor bracket 36 and further that the bottom positioning bolt 42 passes through the bottom rubber grommet 44 and is tightened by a nut plate 46, with a washing 48 placed between the bottom rubber grommet 44 and the head 42a of the bottom positioning bolt 42. A metal spacer 50 is forcedly fitted inside the bottom rubber grommet 44 to avoid excessive crush of the latter which would otherwise occur as the nut plate 46 is tightened strongly. The bottom grommet 44 plays a key part in isolating the vehicle frame 34 from vibration of the pump motor 30 and the fluid pump 32.

A support ledge 52 is affixed to the vehicle frame 34 by means of a bolt 54 in such a fashion that it can support the lower extension 40 of the motor bracket 36. The support ledge 52 has slot 56 extending generally in parallel to the vehicle frame 34. The slot 56 which slidingly receives the head 42a of the bottom positioning bolt 42 is somewhat wider than the diameter of the head 42a and has a length great enough to permit the pump motor 30 to be laterally moved into a temporary, easy-to-access, maintenance position as set forth later in detail.

Figure 7:
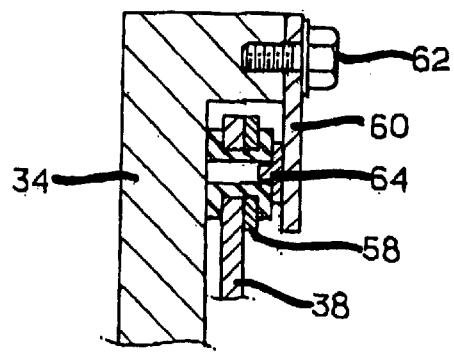
FIG. 7 is a sectional view taken along line VII—VII in FIG. 4, best illustrating the upper extension of a motor bracket depressed against a vehicle frame by means of a top fixture plate.
Figure 8:
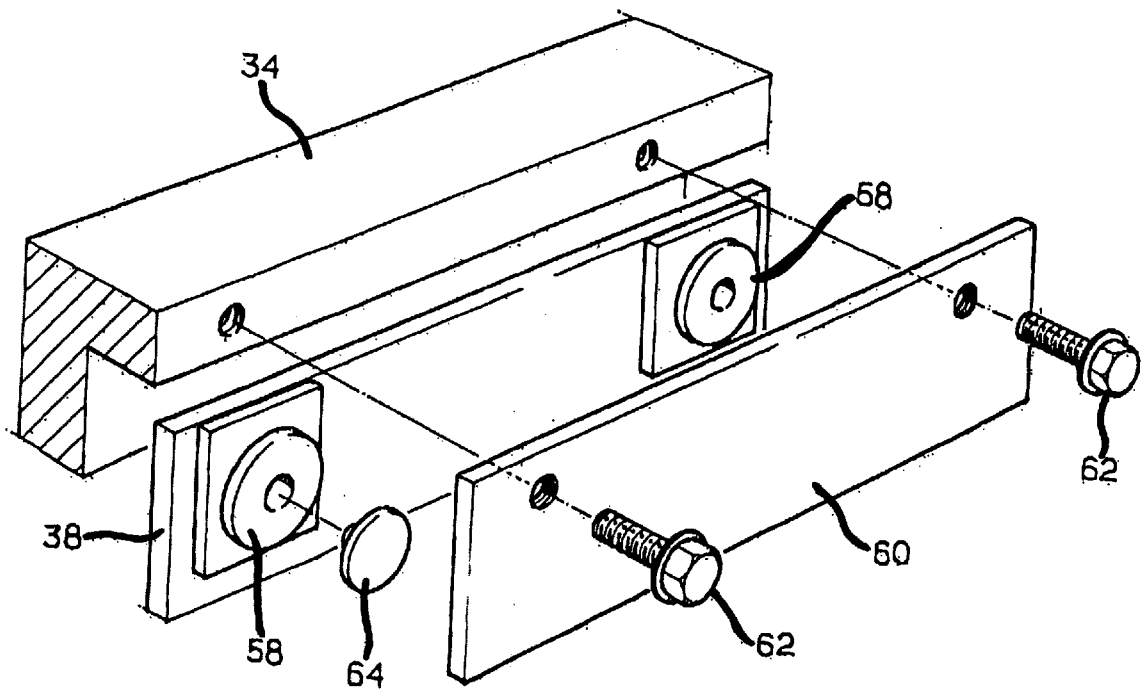
FIG. 8 is a partially cutaway perspective view showing the upper extension of a motor bracket and a top fixture plate bolted to a vehicle frame to depress the motor bracket against the vehicle frame.

As best shown in FIGS. 7 and 8, a top rubber grommet 58 is inserted through the thickness of the upper extension 38 of the motor bracket 36. The top rubber grommet 58 and hence the top end of the upper extension 38 of the motor bracket 36 are depressed against the vehicle frame 34 by a top fixture plate 60 which is removably affixed to the vehicle frame 34 with a fixture bolt 62. The top rubber grommet 58 serves to isolate the vehicle frame 34 from vibration of the pump motor 30 and the fluid pump 32.

Provided between the top rubber grommet 58 and the top fixture plate 60 is a friction reducing disc 64 which functions to decrease frictional force otherwise developed between the top rubber grommet 58 and the top fixture plate 60 as the pump motor 30 is slidingly moved into the temporary maintenance position together with the motor bracket 36. The friction reducing disc 64 is made of plastic or other suitable low-friction material.

With the pump motor mounting arrangement described above, the task of mounting and demounting the pump motor can be carried out in an extremely convenient and time-effective fashion. Specifically, the pump motor 30 can be mounted to the industrial vehicle by way of simply laying down the lower extension 40 of the motor bracket 36 on the support ledge 52 with the head 42a of the bottom positioning bolt 42 received in the slot 56 of the support ledge 52 and then tightening the bolt 62 to have the top fixture plate 60 depress the upper extension 38 of the motor bracket 36 against the vehicle frame 34. Demounting procedure of the pump motor 30 is performed in the exactly reverse order of the mounting operation.

It is important to note that the pump motor 30 can be slidingly moved from an in-use position into the temporary, easy-to-access, maintenance position indicated in phantom lines in FIG. 4 by way of loosening the fixture bolt 62 and pushing the pump motor 30 rightwards as viewed in FIG. 4. The slot 56 of the support ledge 52 remains in engagement with the head 42a of the bottom positioning bolt 42, thus prohibiting the pump motor 30 from inadvertent detachment from the vehicle frame 36 in the process of sliding movement of the pump motor 30. If the pump motor 30 is moved into the temporary maintenance position, it becomes possible to check, repair and replace components, e.g., brush, of the electric pump motor 30 without having to completely demount the latter.

Although the preferred embodiments of the invention have been disclosed for illustrative purposes, those skilled in the art will appreciate that various modifications, additions and substitutions are possible without departing from the scope and spirit of the invention as set forth in the accompanying claims.

What is claimed is:

1. A pump motor mounting arrangement for detachably mounting a pump motor to an industrial vehicle, comprising:

a vehicle frame;

a motor bracket adapted to be fixedly secured to the pump motor, the motor bracket having an upper extension and a lower extension;

a bottom positioning member provided on the lower extension of the motor bracket and having a downwardly projecting head;

a support ledge affixed to the vehicle frame for supporting the lower extension of the motor bracket, the support ledge having a slot extending generally in parallel to the vehicle frame, the head of the bottom positioning member adapted to be in sliding engagement with the slot of the support ledge; and fixture means for, when tightened, depressing the upper extension of the motor bracket against the vehicle frame to keep the pump motor in place and for, when loosened, allowing the pump motor to be slidingly moved on the support ledge into a temporary maintenance position.

2. A pump motor mounting arrangement as recited in claim 1, wherein the motor bracket is provided with a bottom rubber grommet fitted through the thickness of the lower extension of the motor bracket.

3. A pump motor mounting arrangement as recited in claim 1, wherein the motor bracket has a top rubber grommet fitted through the thickness of the upper extension of the motor bracket.

4. A pump motor mounting arrangement as recited in claim 1, wherein the upper extension of the motor bracket is of straight configuration and the lower extension of the motor bracket is of generally L-shaped configuration.

5. The pump motor mounting arrangement as recited in claim 2, wherein the bottom positioning member comprises a bolt invertedly fitted through the bottom rubber grommet and removably affixed to the lower extension of the motor bracket.

6. The pump motor mounting arrangement as recited in claim 3, wherein the fixture means comprises a top fixture plate for depressing the upper extension of the motor bracket against the vehicle frame and a fixture bolt for detachably securing the top fixture plate to the vehicle frame.

7. The pump motor mounting arrangement as recited in claim 6, further comprising a friction reducing disc provided between the top rubber grommet and the top fixture plate.

8. A pump motor mounting arrangement for detachably mounting a pump motor to an industrial vehicle, comprising:

a vehicle frame;

a motor bracket adapted to be fixedly secured to the pump motor, the motor bracket having an upper extension and a lower extension;

support means for supporting the lower extension of the motor bracket, the support means kept in sliding engagement with the lower extension of the motor bracket; and fixture means for, when tightened, depressing the upper extension of the motor bracket against the vehicle frame to keep the pump motor in place and for, when loosened, allowing the pump motor to be slidingly moved on the support means into a temporary maintenance position.

* * * * *